US006623639B2

(12) United States Patent
Barss et al.

(10) Patent No.: US 6,623,639 B2
(45) Date of Patent: Sep. 23, 2003

(54) SOLVENT-RESISTANT MICROPOROUS POLYBENZIMIDAZOLE MEMBRANES

(75) Inventors: Robert P. Barss, Bend, OR (US); Dwayne T. Friesen, Bend, OR (US); Scott B. McCray, Bend, OR (US); Kendall R. Pearson, Bend, OR (US); Roderick J. Ray, Bend, OR (US); Delores R. Sidwell, Westfir, OR (US); James B. West, Bend, OR (US)

(73) Assignee: Bend Research, Inc., Bend, OR (US)

( * ) Notice: Subject to any disclaimer, the term of this patent is extended or adjusted under 35 U.S.C. 154(b) by 0 days.

(21) Appl. No.: 09/525,580

(22) Filed: Mar. 15, 2000

(65) Prior Publication Data

US 2003/0159980 A1 Aug. 28, 2003

Related U.S. Application Data

(60) Provisional application No. 60/125,345, filed on Mar. 19, 1999.

(51) Int. Cl.$^7$ .................................................. B01D 69/08
(52) U.S. Cl. ............................ 210/500.23; 210/500.1; 210/500.21; 96/10; 264/41; 264/176.1; 264/177.13; 264/177.14; 264/177.17; 264/177.19; 264/178 R; 264/209.1; 264/211.12; 264/211.13; 264/211.14; 264/211.17

(58) Field of Search .................... 210/321.8, 321.89, 210/500.23, 500.33, 500.39, 508, 500.1, 500.21; 95/45, 52; 96/10, 12, 13; 264/41, 45.9, 176.1, 177.13, 177.14, 177.17, 177.19, 178 R, 209.1, 235, 209.6, 346, 211.12, 211.13, 211.14, 211.17

(56) References Cited

U.S. PATENT DOCUMENTS

| 3,441,640 A | | 4/1969 | Santegalo | 264/203 |
|---|---|---|---|---|
| 3,720,607 A | | 3/1973 | Brinegar | 210/500.21 |
| 3,737,042 A | * | 6/1973 | Boom | 210/500.21 |
| 4,020,142 A | | 4/1977 | Davis et al. | 264/41 |
| 4,448,687 A | | 5/1984 | Wang | 210/500.2 |
| 4,460,641 A | * | 7/1984 | Barer et al. | 428/346 |
| 4,512,894 A | | 4/1985 | Wang | 210/500.2 |
| 4,693,824 A | | 9/1987 | Sansone | 210/500.28 |
| 4,693,825 A | | 9/1987 | Trouw | 210/500.28 |
| 5,468,430 A | * | 11/1995 | Ekiner et al. | 264/28 |
| 5,611,842 A | * | 3/1997 | Friesen et al. | 95/50 |
| 5,753,008 A | | 5/1998 | Friesen et al. | 95/45 |

* cited by examiner

*Primary Examiner*—John Kim
(74) *Attorney, Agent, or Firm*—Chernoff, Vilhauer, McClung & Stenzel, LLP

(57) ABSTRACT

Solvent-resistant polybenzimidazole membranes, methods of making them and crosslinking them and composite membranes and hollow fiber membrane modules from them are disclosed.

12 Claims, No Drawings

SOLVENT-RESISTANT MICROPOROUS POLYBENZIMIDAZOLE MEMBRANES

The priority of Provisional Application Ser. No. 60/125,345, filed Mar. 19, 1999 is claimed.

The government has certain rights in this invention pursuant to Contract No. 68D70053 awarded by the Environmental Protection Agency.

BACKGROUND OF THE INVENTION

Microporous flat sheet and hollow fiber membranes are well known in the art. See, for example, U.S. Pat. Nos. 4,230,463 and 4,772,391. Such membranes are typically made by a solution-casting process (flat sheets) or by a solution precipitation process (hollow fibers), wherein the polymer is precipitated from a polymer/solvent solution. Conventional polymers used for microporous membrane formation by solution precipitation are not resistant to the solvents used to form the polymer solution for the casting or spinning fabrication, or to solvents of similar strength since such solvents dissolve or swell the polymer. Thus, membranes made from conventional polymers cannot be used to treat feed streams containing solvents or other harsh chemicals.

The manufacture of solvent-resistant membranes from polyimides is well known in the art. See, for example, commonly assigned U.S. Pat. No. 5,753,008. This patent discloses a process for spinning a fiber from a precursor polymer, and then rendering the fiber solvent-resistant in a post-casting step. Such membranes are indeed solvent-resistant. However, polyimides are known to be susceptible to hydrolysis when exposed to water at elevated temperatures. As a result, these solvent-resistant microporous polyimide fibers are not suitable for applications where the stream to be treated is hot and contains water.

One polymer that has been shown to be stable to hot water is polybenzimidazole (PBI). PBI has also been shown to be chemically resistant after crosslinking. See, for example, U.S. Pat. Nos. 4,693,824, 4,020,142, 3,720,607, 3,737,042, 3,841,492, 3,441,640, 4,693,825, 4,512,894 and 4,448,687. In these patents, various processes for making membranes from PBI are disclosed. However, the resulting membranes are not microporous, but instead have a dense skin on at least one surface, resulting in low permeation rates. These patents also disclose a number of techniques for crosslinking the PBI membranes. However, these crosslinking procedures lead to a dramatic increase in the brittleness of the membrane, making them difficult to manufacture and use.

BRIEF SUMMARY OF THE INVENTION

There are several aspects of the present invention.

In a first aspect, the invention comprises a microporous solvent-resistant hollow fiber membrane formed from polybenzimidazole (PBI), the membrane being characterized by exceptional nitrogen permeance, high tensile strength and high elongation at break, making it particularly well-suited as a coatable support for fabricating composite permselective membranes.

In a second aspect, the invention comprises a method of making such a solvent-resistant PBI membrane.

In a third aspect, the invention comprises a countercurrent flow separation module incorporating a composite membrane wherein at least one selective coating is placed on a surface of such a solvent-resistant PBS membrane.

In a fourth aspect, the invention comprises a method of crosslinking a membrane (hollow fiber, flat sheet, or tubular; microporous, isoporous, non-porous, or asymmetric) formed from PBI using a multi-functional alkyl halide.

The membranes of the present invention are useful for a variety of applications, including ultrafiltration, microfiltration and membrane contactors; and as supports for composite membranes that are used in such applications as reverse osmosis, nanofiltration, pervaporation, vapor permeation and gas separations.

DETAILED DESCRIPTION OF THE PREFERRED EMBODIMENTS

In contrast to the procedures of the prior art, it has now been found that microporous PBI membranes with exceptional performance and solvent resistance, can be made by proper selection of the procedures for making and crosslinking the membranes.

In one aspect, the invention comprises a microporous hollow fiber membrane formed from PBI, the membrane being fabricated by the following steps:

(a) providing a fiber-spinning polymer solution comprising 15 to 30 wt % PBI, 2 to 5 wt % high molecular weight pore-former with a molecular weight of >1000 daltons, 5 to 30 wt % low molecular weight pore-former, with a molecular weight of <100 daltons, and a solvent;

(b) forming a spun membrane by extruding the polymer solution through an orifice at a temperature of 25° to 60° C. while simultaneously injecting a coagulating fluid through a needle located in the orifice;

(c) providing a quench bath;

(d) passing the spun membrane through the quench bath at a temperature of 10° to 40° C. to form a microporous hollow fiber membrane; and (e) rinsing the membrane.

Additional optional steps include drying and post-treating the membrane by crosslinking or annealing.

The microporous hollow fiber PBI membranes formed by this process have excellent properties for a wide variety of membrane separation processes. Generally, the membranes have a gas permeance of at least 5 $m^3/m^2 \cdot hr \cdot atm$, preferably at least 10 $m^3/m^2 \cdot hr \cdot atm$. In addition, the surface pores on the membrane (both inside and outside surfaces of the hollow fiber) are greater than about 0.05 $\mu m$, and less than about 1 $\mu m$. The fibers have a tensile strength of at least 100 g/filament, preferably at least 200 g/filament. The fibers also have an elongation at break of at least 10%, preferably at least 15%. The fibers can also be made with a wide range of diameters and wall thicknesses, depending on the application of use. Generally, the inside diameter of the fibers can range from about 200 $\mu m$ to about 1000 $\mu m$, and the wall thickness of the fibers can range from about 30 $\mu m$ to about 200 $\mu m$.

The invention can be used with virtually any PBI, and in particular with those described in U.S. Pat. Nos. 2,895,948, 5,410,012, and 5,554,715, the disclosures of which are incorporated herein by reference. These PBIs have the following general repeat structure:

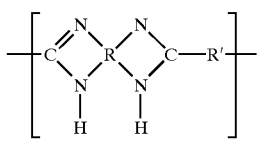

where R is a tetravalent aromatic nucleus, typically symmetrically substituted, with the nitrogen atoms forming the benzimidazole rings being paired upon adjacent carbon atoms of the aromatic nucleus, and R' is selected from (1) an aromatic ring, (2) an arylene group, (3) an alkylene group, (4) an arylene-ether group, and (5) a heterocyclic ring, such as a pyridine, pyrazine, furan, quinoline, thiophene, or pyran. A preferred PBI is poly(2,2'-[m-phenylene])-5,5'-bis-benzimidazole.

It has been found that to obtain a microporous fiber with high porosity and high gas permeance while maintaining excellent physical properties such as high tensile strength and elongation at break, a mixture of a high molecular weight pore-former and a low molecular weight pore-former should be used. The weight ratio of high molecular weight pore-former to low molecular weight pore-former should range from 0.05 to 0.5, preferably from 0.075 to 0.25.

The high molecular weight pore former should have a molecular weight of at least about 1000 daltons. It should also be soluble in the solvent used for the fiber-spinning polymer solution and in the materials used for the internal coagulation solution and the quench bath. Examples of suitable high molecular weight pore-formers include polyvinyl pyrollidinone (PVP), polyvinyl alcohol (PVA), polyvinyl acetate (PVAc), polyethylene glycol (PEG), and polypropylene glycol (PPG). A preferred high molecular weight pore-former is PVP.

The low molecular weight pore-former should have a molecular weight of no greater than about 100 daltons, and should be hydrophilic. It should also be soluble in the solvent used for the fiber-spinning polymer solution and in the materials used for the internal coagulation solution and the quench bath. In general, the class of useful low molecular weight pore-formers comprises (i) a lower alkanol, (ii) a polyfunctional alcohol, (iii) ester and ether derivatives of an alkanol, (iv) ester and ether derivatives of a polyfunctional alcohol, (v) mixtures of (i)–(iv), and (vi) mixtures of water and at least one of (i)–(v).

Examples of suitable low molecular weight pore-formers include monofunctional alcohols, such as methanol (MeOH), ethanol (EtOH), isopropyl alcohol (IPA), n-propanol, and the various isomers of butanol; polyfunctional alcohols, such as ethylene glycol, propylene glycol, and glycerol; and ether and ester derivatives of monofunctional and polyfunctional alcohols. A preferred low molecular weight pore-former is n-propanol.

Preferred solvents for the fiber-spinning solution include dimethylacetamide (DMAc), dimethylformamide (DMF) and N-methyl pyrrolidone (NMP). The fiber-spinning polymer solution preferably is filtered to remove oversize particles and lumps through a fine gage (10–30 $\mu$m) filter, and has a viscosity of from 15,000 to 50,000 cp at the spinning temperature, which is preferably conducted at from 250 to 60° C. Fiber-spinning or extrusion is conducted at an extension rate of from 1 to 5 cm$^3$/min, depending upon the spinning solution viscosity and the temperature at which the extrusion is conducted. A preferred extrusion rate is 2 cm$^3$/min. Conventional tube-in-orifice spinnerets may be used, typically having an orifice diameter on the order of 500 to 1500 $\mu$m and a tube on the order of 25- to 30-gage.

Both the internal coagulation solution and the quench bath preferably comprise a polar solvent selected from MeOH, EtOH, n-propanol, IPA, DMAc, water and mixtures thereof. Rinsing is preferably conducted with water and/or IPA.

In another aspect, the invention comprises a method for crosslinking a PBI membrane by the following steps:

(a) providing a crosslinking solution comprising a multi-functional alkyl halide in a solvent;

(b) soaking the membrane in the crosslinking solution for 0.5 to 48 hours and at a temperature from 50 to 150° C.; and (c) drying the membrane for 0.5 to 48 hours at a temperature of 25° to 200° C.

The multi-functional alkyl halide should contain at least two halide substituents, and has the general structure

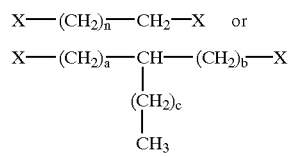

where X is Br or Cl, n is 1 to 11, a is 1 to 10, b is 0 to 4, and c is 0 to 6. A preferred class of difunctional alkyl halides comprises straight chain, terminally di-substituted compounds having the structure

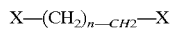

where X and n are as defined above. A most preferred difunctional alkyl halide is dibromobutane (DBB).

The alkyl halide may also contain three or more halide substituents. Exemplary alkyl halides with three or more halide substituents include tribromopropahe, trichloropropane, pentaerythrityl tetrabromide, and pentaerythrityl tetrachloride.

The solvent used to dissolve the alkyl halide should not react with the alkyl halide and should not dissolve the uncrosslinked PBI membrane. Preferred solvents include ketones, such as acetone, methyl isobutyl ketone (MIBK), methyl ethyl ketone (MEK), and pentanone; and ethers, such as isopropyl ether and butyl ether. The resulting crosslinked PBI membrane has exceptional chemical and thermal resistance.

In another aspect, the invention comprises a crosslinked microporous hollow fiber membrane formed from PBI, the membrane being fabricated by the following steps:

(1) providing a fiber-spinning solution having the makeup noted above;

(2) forming a spun membrane by extrusion as noted above;

(3) passing the spun membrane through a quench bath as noted above to form a microporous hollow fiber membrane;

(4) rinsing the membrane; and (5) crosslinking the membrane as noted above.

In another aspect, the invention comprises a composite hollow fiber membrane comprising at least one permselective coating formed on a crosslinked microporous PBI hollow fiber membrane made as described above. The permselective coating that is applied depends upon the particular separation it is desired to achieve, such as the removal of water vapor from organics, the removal of volatile compounds from water vapor, the separation of organics or the purificationn of water.

In yet another aspect of the invention there is provided a countercurrent flow separation module comprising:

(a) a chamber having feed and retentate ends and means for removing permeate vapor near the feed end;

(b) a bundle of thin film composite hollow fiber membranes arranged substantially parallel to each other in said chamber, each of said composite hollow fiber membranes comprising a solvent-resistant PBI hollow support fiber having at least one permselective coating on a surface thereof, the PBI support fiber having been formed by and optionally crosslinked by the methods noted above; and (c) means for securing and sealing the bundle of hollow fiber membranes to the chamber at its feed and retentate ends so as to permit fluid communication with a feed stream.

Details of the construction and operation of such a vapor separation module are exemplified in Examples 28–31 herein and in commonly assigned U.S. Pat. No. 5,753,008, the pertinent disclosures of which are incorporated herein by reference.

For the removal of water from a feed stream, it is best that the permselective coating material be more permeable to water than to other components in the feed stream. In this case, the material is preferably very hydrophilic. Examples of permselective coating materials useful for removing water from organics include polyvinyl alcohol (PVA), cellulosic materials, chitin and derivatives thereof, polyurethanes, polyamides, polyamines, poly(acrylic acids), poly(acrylates), poly(vinyl acetates), and polyethers. Other polymers normally viewed as not especially hydrophilic such as polyolefins, polystyrene, and poly-acrylates can be rendered sufficiently hydrophilic to be selective to water vapor by incorporating hydrophilic groups such as hydroxyl, amine, carboxyl, ether, sulfonate, quaternary amine, carboxyl, ether, sulfonate, phosphonate, quaternary amine, and ester functionalities. Such groups can be incorporated by choosing monomers that contain such groups or by adding them in a post-treatment step such as radiation- or plasma-grafting. Blends and copolymer versions of these materials are also useful. The coating material should also be crosslinked to provide sufficient resistance to swelling or dissolution by components of the feed stream.

A particularly preferred permselective coating material for dehydration of organics is a blend of PVA and polyethyleneimine (PEI), wherein the material is crosslinked through the amine groups of the PEI using ethyl succinate by heating to elevated temperatures. By varying the ratio of PVA to PEI or the amount of ethyl succinate crosslinking agent used, the selectivity and permeability of the membrane may be adjusted. This coating will be extremely effective for vapor permeation applications. However, it will also prove useful for other separations including dehydration of organics by pervaporation; the removal of water vapor from compressed gas streams, such as air and natural gas; and for use in fuel cells, allowing the transport of water while restricting the passage of hydrogen.

A particularly preferred class of permselective coating materials for water purification by reverse osmosis or nanofiltration is polyamides formed by interfacial polymerization. Examples of such coatings as found in U.S. Pat. Nos. 5,582,725, 4,876,009, 4,853,122, 4,259,183, 4,529,646, 4,277,344 and 4,039,440, the pertinent disclosures of which are incorporated herein by reference.

For the removal of volatile compounds from water or gas streams such as air or nitrogen, the permselective coating is usually, but not always, an elastomeric or rubbery polymer. Examples of materials useful for such separations include natural rubber, nitrile rubber; polystyrene-butadiene copolymers; poly(butadiene acrylonitrile) rubber; polyurethanes; polyamides, polyacetylenes; poly(trimethylsilylpropyne); fluoroelastomers; poly(vinylchlorides); poly(phosphazenes), particularly those with organic substituents; halogenated polymers, such as poly(vinylidene fluoride) and poly(tetrafluoroethylene); and polysiloxanes, including silicone rubber. Blends and copolymer versions of these materials are also useful. Ion exchange membranes and composites may also be used for some applications. A particularly preferred coating for the removal of volatile compounds from water or gas streams is poly(dimethylsiloxane) and derivatives thereof.

For separation of organic mixtures, the choice of permselective coating material will depend on the organics being separated. Many of the polymers listed above for the dehydration of organics or the removal of volatile organics from water or gas streams will work well for separating certain organic mixtures. In particular, it is common to use copolymers for separating organics since the ratio of the so-called "hard" and "soft" segments can easily be adjusted to provide the desired selectivity.

The permselective coating material may be placed on the surface of the support fiber using a number of conventional techniques, including dip-coating, painting, spray-coating, solution-coating, or by interfacial polymerization. The coating may be placed on the inside (lumens) or outside surface of the support fiber; in most applications it is preferred that the coating be placed on the lumens.

EXAMPLE 1

A fiber-spinning solution was prepared consisting of 18 wt % poly(2,2'-[m-phenylene])-5,5' bis-benzimidazole (Hoechst-Celanese, Charlotte, N.C.), 3 wt % PVP (K16–18, Acros Organics, New Jersey) (a high molecular weight pore former with a molecular weight of 8000 daltons), 22 wt % n-propanol (a low molecular weight pore-former with a molecular weight of 60 daltons), 0.4 wt % water and the balance DMAC. This solution was filtered through a 20 $\mu$m polypropylene filter while transferring the same to a reservoir held at a pressure of 25 inches of vacuum. The viscosity of the solution at 50° C. was 13,800 cp. The fiber-spinning solution was then extruded at a rate of 2 cm$^3$/min at 50° C. through a tube-in-orifice spinneret having an orifice diameter of 800 $\mu$m and a 27-gage tube using 100% IPA as the internal coagulation solution. The hollow fiber formed by this extrusion was drawn at a rate of 460 cm/min into a quench bath at 30° C. comprising 75 wt % IPA and 25 wt % methanol. The resulting solidified fiber was rinsed in water at 40° C. for about 2 hours, drained, and then rinsed overnight in IPA at room temperature.

The resulting microporous hollow fiber membrane had an average internal diameter of 420 $\mu$m and an average wall thickness of 80 $\mu$m. Microporosity of the fibers was indicated by their high nitrogen permeance of 25 m$^3$/m$^2$·hr·atm. The fibers had a tensile strength of 620 g/filament and an elongation at break of 22%.

To effect crosslinking, samples of the hollow fiber membranes were soaked for 16 hours in a solution comprising 5 wt % dibromobutane (DBB) in methyl isobutyl ketone (MIBK) at 100° C., air-dried for about 1 hour and then heat-treated at 150° C. for 3 hours. The resulting fibers had the properties shown in Table 1.

EXAMPLE 2

To test the solvent resistance of the fibers, crosslinked and uncrosslinked fiber samples from Example 1 were soaked for 72 hours in a solution of N-methyl pyrollidinone (NMP) at 100° C., which caused the uncrosslinked fibers to dissolve, and the crosslinked fibers to absorb NMP and swell, but remain intact. As shown in Table 1, the crosslinked fibers maintained high strength (i.e., greater than 100 g/fil) and high elongation at break values. After drying the crosslinked fibers to remove NMP, their permeance to nitrogen was tested and shown to be the same as for the crosslinked fibers of Example 1 before exposure to the solvent and high temperature.

TABLE 1

| Example No. | Tensile Strength (g/fil) | Elongation at Break (%) | Nitrogen Permeance* |
|---|---|---|---|
| 1 (uncrosslinked) | 720 | 20 | 25 |
| 1 (crosslinked) | 920 | 21 | 45 |
| 2 (crosslinked) | 250 | 75 | 45 |
| 2 (uncrosslinked) | Dissolved | Dissolved | — |

*$m^3/m^2 \cdot hr \cdot atm$

COMPARATIVE EXAMPLE

Hollow fiber membranes were cast as in Example 1 except that no high molecular weight pore-former was included, the fiber-spinning solution comprised 18 wt % PBI, 25 wt % n-propanol, 0.4 wt % water, and the balance DMAC. The fiber-spinning solution was maintained at 30° C. and there was no crosslinking. The resulting hollow fibers exhibited virtually no permeance to nitrogen.

EXAMPLE 3

Hollow fiber membranes were prepared as in Example 1 with the following exceptions: the fiber-spinning solution was maintained at a temperature of 30° C., the viscosity of the fiber-spinning solution at 30° C. was 37,000 cp, and there was no crosslinking.

The resulting microporous hollow-fiber had an average internal diameter of 440 μm and an average wall thickness of 100 μm. The microporosity of the fibers was indicated by their high nitrogen permeance of 25 $m^3/m^2 \cdot hr \cdot atm$. The fibers had a tensile strength of 720 g/fil and an elongation at break of 20%.

EXAMPLES 4–8

Hollow fiber membranes were prepared as in Example 1 with the internal coagulation solutions given in Table 2 and there was no crosslinking. The nitrogen permeance, tensile strength, and elongation at break of these fibers were as shown in Table 2.

TABLE 2

| Example | Internal Coagulation Solution | Nitrogen Permeance* | Tensile Strength (g/fil) | Elongation at Break (%) |
|---|---|---|---|---|
| 4 | 85 wt % IPA/15 wt % MeOH | 18 | 414 | 15 |
| 5 | 55 wt % IPA/15 wt % MeOH | 8 | 399 | 18 |
| 6 | 80 wt % DMAC/20 wt % MeOH | 21 | 243 | 7 |
| 7 | 20 wt % DMAC/80 wt % MeOH | 8 | 213 | 5 |
| 8 | 28 wt % DMAC/5 wt % water/67 wt % MeOH | 4 | 259 | 15 |

*$m^3/m^2 \cdot hr \cdot atm$

EXAMPLES 9–13

Hollow fiber membranes were prepared as in Example 1 except that the quench solution comprised 100% IPA, and the fiber-spinning polymer solution temperatures and internal coagulation solutions were as noted in Table 3, and there was no crosslinking. The nitrogen permeance, tensile strength, and elongation at break of these fibers were as shown in Table 3.

TABLE 3

| Example | Polymer Solution Temperature | Internal Coagulation Solution | Nitrogen Permeance* | Tensile Strength (g/fil) | Elongation at Break (%) |
|---|---|---|---|---|---|
| 9 | 30° C. | 20 wt % DMAC in IPA | 9 | 350 | 14 |
| 10 | 40° C. | 20 wt % DMAC in IPA | 5 | 340 | 11 |
| 11 | 50° C. | 20 wt % DMAC in IPA | 9 | 300 | 16 |
| 12 | 50° C. | 10 wt % DMAC in IPA | 14 | 340 | 10 |
| 13 | 50° C. | 30 wt % DMAC in IPA | 13 | 290 | 14 |

*$m^3/m^2 \cdot hr \cdot atm$

EXAMPLES 14–23

Hollow fiber membranes were prepared as in Example 1 using the fiber-spinning polymer solution formulations and temperatures, and internal coagulation solutions listed in Table 4 and using 100% IPA as the quench solution and with no crosslinking. The nitrogen permeance, tensile strength, and elongation at break of these fibers were as shown in Table 4.

TABLE 4

| Ex. | PBI (wt %) | PVP (wt %) | N-propanol (wt %) | Water (wt %) | Polymer Solution Temp. | Internal Coagulation Solution | Nitrogen Permeance** | Tensile Strength (g/fil) | Elongation at Break (%) |
|---|---|---|---|---|---|---|---|---|---|
| 14 | 16 | 3 | 22 | 0.25 | 30° C. | 20 wt % MeOH in IPA | 45 | 330 | 9 |
| 15 | 16 | 5 | 20 | 0.4 | 30° C. | 20 wt % DMAC in IPA | 55 | 305 | 12 |
| 16 | 16 | 5 | 20 | 0.4 | 30° C. | 100% IPA | 87 | 320 | 8 |
| 17 | 16 | 5 | 20 | 0.4 | 30° C. | 30 wt % DMAC in IPA | 68 | 400 | 6 |
| 18 | 17 | 4 | 21 | 0.4 | 30° C. | 20 wt % DMAC in IPA | 58 | 315 | 11 |
| 19 | 17 | 5 | 20 | 0.4 | 30° C. | 20 wt % DMAC in IPA | 52 | 325 | 11 |

TABLE 4-continued

| Ex. | Polymer Solution Formulation* | | | | Polymer Solution Temp. | Internal Coagulation Solution | Nitrogen Permeance** | Tensile Strength (g/fil) | Elongation at Break (%) |
|---|---|---|---|---|---|---|---|---|---|
| | PBI (wt %) | PVP (wt %) | N-propanol (wt %) | Water (wt %) | | | | | |
| 20 | 17 | 5 | 20 | 0.4 | 40° C. | 20 wt % DMAC in IPA | 50 | 340 | 10 |
| 21 | 18 | 3 | 22 | 0.4 | 30° C. | 5 wt % MeOH in IPA | 26 | 340 | 7 |
| 22 | 18 | 4 | 21 | 0.4 | 30° C. | 20 wt % DMAC in IPA | 38 | 455 | 12 |
| 23 | 18 | 5 | 20 | 0.4 | 30° C. | 20 wt % DMAC in IPA | 36 | 400 | 12 |

*Balance DMAC
**$m^3/m^2 \cdot hr \cdot atm$

EXAMPLES 24–27

Fibers from Example 1 were crosslinked as in Example 1 except that the concentration of DBB was varied as indicated in Table 5 and the DBB was dissolved in methyl ethyl ketone (MEK). The tensile strengths and fiber elongations at break after crosslinking and before and after soaking in NMP for 72 hours at 100° C. are also reported in Table 5.

TABLE 5

| | | After Crosslinking | | After NMP Soak | |
|---|---|---|---|---|---|
| Example | DBB Conc. (wt %) | Tensile Strength (g/fil) | Elongation at Break (%) | Tensile Strength (g/fil) | Elongation (%) |
| 24 | 0.2 | 898 | 27 | 150 | 56 |
| 25 | 0.5 | 862 | 27 | 208 | 147 |
| 26 | 1.0 | 985 | 23 | 439 | 71 |
| 27 | 5.0 | 933 | 19 | 612 | 31 |

EXAMPLE 28

A bundle comprising 20 crosslinked hollow fibers of Example 1 was incorporated into a module with an epoxy potting compound. The module was equipped with a permeate port located near its feed end and a second port located near its retentate end. The effective length and area of the fibers were 38 cm and 96 cm², respectively. The fibers in this module were rinsed first with 200 ml of acetone and then with about 200 ml of a 0.5 wt % ammonia solution in water.

A selective coating was formed on the inner surface or lumens of the fibers in this module using the following procedure. First, an aqueous solution comprising 1 wt % N,N',N",N'"-tetramethyl tetra-kis-aminomethyl methane and 0.5 wt % triethyl amine was circulated through the fibers for 2 minutes. This solution was then drained from the fibers by gravity and dry nitrogen was forced down the fiber lumens for 2 minutes. Next, a 0.5 wt % solution of isophthaloyl chloride in hexane was circulated through the fiber lumens for 1 minute, resulting in the formation of an interfacially polymerized polyamide coating on the inner or lumen surface. The coating was dried by forcing dry nitrogen at ambient temperature down the fiber lumens for 10 minutes, then increasing the temperature of the dry nitrogen to 60° C. for 16 hours. The resulting composite hollow fiber membrane module had a permeability to dry nitrogen of less than 0.2 $m^3/m^2 \cdot hr \cdot atm$.

EXAMPLE 29

The module of Example 28 was evaluated in a reverse osmosis test by circulating a feed solution comprising 5000 ppm $MgSO_4$ in water at 25° C. and pH 6 through the fiber lumens at a pressure of 28 atm. The module exhibited a water flux of about 110 $L/m^2 \cdot hr$ and a salt rejection of 99%.

EXAMPLE 30

A module was prepared as in Example 28, except that a second coating was formed on top of the interfacially polymerized polyamide coating as follows. Solution A was prepared by dissolving 10 g of polyethyleneimine in 90 g of water to make a 10 wt % solution. Solution B was prepared by dissolving 10 g of polyvinyl alcohol in 90 g of hot (80° C.) water, then allowed to cool, forming a 10 wt % solution. Solution C was prepared by dissolving 10 g of succinic anhydride and 5 g of 1 M HCl in 85 g of hot (65° C.) ethanol, then allowed to cool. A coating solution was then formed by mixing 47 g of Solution A, 23 g of Solution B, and 10 g of Solution C in 10 g water, 10 g ethanol, and two drops of surfactant.

The second coating was applied on top of the polyamide coating by filling the lumens of the hollow fibers with the second coating solution for 1 minute, then draining by gravity. Dry nitrogen at room temperature was first forced through the lumens of the fibers for 10 minutes. The module was then rotated end-for-end and the process repeated. Hot nitrogen at 80° C. was then forced through the lumens of the fibers for 2 hours. The temperature of the nitrogen was then increased to 130° C. and the procedure repeated for 3 hours. Finally, dry nitrogen at ambient temperature was forced through the lumens of the fibers overnight. The resulting composite hollow fiber membrane module had a permeability to dry nitrogen of less than 0.05 $m^3/m^2 \cdot hr \cdot atm$.

EXAMPLE 31

A module was prepared as in Example 30 except that a bundle of about 2900 fibers was used and the effective membrane area of the module was 2.8 m². This module was then tested using a vaporous feed stream of 5.2 wt % water in IPA at 91° C. at a flow rate of 0.82 kg/min and a pressure of 1.2 atm (absolute). A sweep stream of dry nitrogen at 57 L/min and 90° C. was introduced at the permeate port located near the retentate end of the module. The combined sweep stream/permeate exiting the module at the permeate port located near the feed end of the module was directed to a vacuum pump, which maintained the pressure on the permeate side of the fibers at about 0.1 atm. The concentration of IPA in the vacuum exhaust was measured to be 0.5 mol %. The vaporous retentate stream exiting the module was condensed and had a water concentration of 0.03 wt %. Based on these data, the water permeability of the module was calculated to be about 9 $m^3/m^2 \cdot hr \cdot atm$, while the IPA permeability was calculated to be about 0.0003 $m^3/m^2 \cdot hr \cdot atm$. Thus, the module had a water/IPA selectivity of about 30,000.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of making a polybenzimidazole microporous hollow fiber membrane comprising the steps:

(a) providing a polymer solution comprising 15 to 30 wt % polybenzimidazole, 2 to 5 wt % high molecular weight pore-former having a molecular weight of ≧1000 daltons, 5 to 30 wt % low molecular weight pore-former having a molecular weight of ≦100 daltons, and a solvent;

(b) forming a spun membrane by extruding said polymer solution of step (a) through an orifice at a temperature of 25° to 60° C. while simultaneously injecting a coagulating fluid through a needle located in said orifice;

(c) providing a quench bath;

(d) passing the spun membrane of step (b) through said quench bath at a temperature of from 10° to 40° C. to form a microporous hollow fiber membrane; and (e) rinsing said membrane of step (d).

2. The method of claim 1 wherein said high molecular weight pore-former is selected from the group consisting of polyvinyl pyrollidinone, polyvinyl alcohol, polyvinyl acetate, polyethylene glycol and polypropylene glycol; and said low molecular weight pore-former is selected from the group consisting of (i) a lower alkanol, (ii) a polyfunctional alcohol, (iii) ester and ether derivatives of an alkanol, (iv) ester and ether derivatives of a polyfunctional alcohol, (v) mixtures of (i)–(iv), and (vi) mixtures of water and at least one of (i)–(v).

3. The method of claim 1 wherein said high molecular weight pore-former is polyvinyl pyrollidinone and said low molecular weight pore-former is n-propanol.

4. The method of claim 1, including the following additional steps:

(f) drying said membrane of step (d); and (g) post-treating said membrane of step (f).

5. The method of claim 4 wherein step (g) is selected from annealing and crosslinking.

6. The method of claim 5 wherein step (g) is crosslinking and said crosslinking is conducted by contacting said membrane with a crosslinking solution comprising a multi-functional alkyl halide in a solvent followed by heating said membrane sufficiently to cause crosslinking to take place.

7. The method of claim 6 wherein said solvent is selected from a ketone and an ether and said multi-functional alkyl halide has a structure selected from

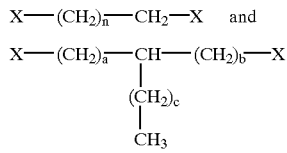

where X is selected from Br and Cl, n is an integer of from 1 to 11, a is an integer of from 1 to 10, b is a number of from 0 to 4, and c is a number of from 0 to 6.

8. The method of claim 7 wherein said multi-functional alkyl halide is dibromobutane, said solvent is selected from the group consisting of acetone, methyl isobutyl ketone, methyl ethyl ketone and pentanone, and said heating is conducted at a temperature of from 25° to 200° C. for 0.5 to 48 hours.

9. The method of claim 6 wherein a surface of said hollow fiber membrane is coated with at least one permselective coating.

10. The method of claim 9 wherein said at least one permselective coating is coated on the lumens of said hollow fiber membrane.

11. The method of claim 9 wherein said at least one permselective coating is a crosslinked polymer selected from the group consisting of poly (acrylic acids), poly (acrylates), polyacetylenes, poly (vinyl acetates), polyacrylonitriles, polyamines, polyamides, polyethers, polyurethanes, polyvinyl alcohols, polyesters, cellulose, cellulose esters, cellulose ethers, chitosan, chitin, polymers containing hydrophilic groups, elastomeric polymers, halogenated polymers, fluoroelastomers, polyvinyl halides, polyphosphazenes, poly (trimethylsilylpropyne), polysiloxanes, poly (dimethyl siloxanes) and copolymers and blends thereof.

12. The product of the method of any of claims 1 or 5–11.

* * * * *

UNITED STATES PATENT AND TRADEMARK OFFICE
CERTIFICATE OF CORRECTION

PATENT NO. : 6,623,639 B2
DATED : September 23, 2003
INVENTOR(S) : Barss et al.

It is certified that error appears in the above-identified patent and that said Letters Patent is hereby corrected as shown below:

Column 2,
Line 30, delete "<" and insert -- $\leq$ --.

Column 3,
Line 25, insert hyphen -- - -- between "pore" and "former".
Line 60, delete "250" and insert -- 25° --.

Column 4,
Line 67, correct the spelling of "purificationn" to -- purification --.

Signed and Sealed this

Twenty-eighth Day of June, 2005

JON W. DUDAS
*Director of the United States Patent and Trademark Office*